United States Patent
Cross (10) Patent No.: US 9,987,591 B2
(45) Date of Patent: Jun. 5, 2018

(54) METHOD FOR REMOVING SULPHUR DIOXIDE FROM GAS STREAMS, USING TITANIUM DIOXIDE AS CATALYST

(71) Applicant: Le Gaz Integral SAS, Nanterre (FR)

(72) Inventor: Peter Frank Cross, Seaford (GB)

(73) Assignee: Le Gaz Integral SAS, Nanterre (FR)

( * ) Notice: Subject to any disclaimer, the term of this patent is extended or adjusted under 35 U.S.C. 154(b) by 0 days. days.

(21) Appl. No.: 14/770,898

(22) PCT Filed: Mar. 3, 2014

(86) PCT No.: PCT/GB2014/050619
§ 371 (c)(1),
(2) Date: Aug. 27, 2015

(87) PCT Pub. No.: WO2014/132087
PCT Pub. Date: Sep. 4, 2014

(65) Prior Publication Data
US 2016/0059187 A1    Mar. 3, 2016

(30) Foreign Application Priority Data

Mar. 1, 2013 (GB) .................................. 1303737.9
May 13, 2013 (RU) ................................ 2013121970

(51) Int. Cl.
*B01D 53/86* (2006.01)
*C01B 17/04* (2006.01)
*F27D 17/00* (2006.01)

(52) U.S. Cl.
CPC ...... *B01D 53/8609* (2013.01); *C01B 17/0486* (2013.01); *F27D 17/008* (2013.01); *B01D 53/864* (2013.01); *B01D 53/8615* (2013.01); *B01D 2255/20707* (2013.01); *B01D 2255/9205* (2013.01); *B01D 2255/9207* (2013.01); *B01D 2257/302* (2013.01); *B01D 2257/304* (2013.01);
(Continued)

(58) Field of Classification Search
None
See application file for complete search history.

(56) References Cited

U.S. PATENT DOCUMENTS

| | | | |
|---|---|---|---|
| 1,857,414 | A | 5/1932 | Thomsen |
| 3,978,200 | A | 8/1976 | Bajars |
| 4,048,287 | A | 9/1977 | Kelleher et al. |

(Continued)

FOREIGN PATENT DOCUMENTS

| | | |
|---|---|---|
| DE | 2 155 320 | 5/1973 |
| EP | 0270223 | 6/1988 |

(Continued)

OTHER PUBLICATIONS

International Search Report for PCT/GB2014/050619, dated Jun. 10, 2014.

*Primary Examiner* — Sheng H Davis
(74) *Attorney, Agent, or Firm* — Hamilton, Brook, Smith & Reynolds, P.C.

(57) ABSTRACT

The present invention relates to a method for removing sulphur dioxide from gaseous effluent, wherein a mixture of gaseous outlet gasses or gaseous effluent includes sulphur dioxide and carbon monoxide, and wherein, to perform a catalytic reduction, a catalyst is used to catalyze a reaction between carbon monoxide and sulphur dioxide to produce carbon dioxide and sulphur.

21 Claims, 2 Drawing Sheets

(52) U.S. Cl.
CPC .... *B01D 2257/502* (2013.01); *B01D 2258/02* (2013.01)

(56) References Cited

U.S. PATENT DOCUMENTS

| | | | |
|---|---|---|---|
| 4,117,101 A | 9/1978 | Fechner et al. | |
| 4,171,348 A | 10/1979 | Bernales et al. | |
| 4,241,041 A * | 12/1980 | Farin | B01D 53/501 |
| | | | 162/36 |
| 4,552,746 A * | 11/1985 | Kettner | B01D 53/8612 |
| | | | 423/224 |
| 5,514,351 A | 5/1996 | Buchanan et al. | |
| 5,798,088 A * | 8/1998 | Dorchak | B01D 53/8603 |
| | | | 423/244.09 |
| 5,891,415 A * | 4/1999 | Alkhazov | C01B 17/0465 |
| | | | 423/230 |
| 6,214,311 B1 | 4/2001 | Kwong | |
| 6,444,185 B1 * | 9/2002 | Nougayrede | B01D 53/8606 |
| | | | 423/242.1 |
| 6,776,974 B1 * | 8/2004 | Burmaster | B01D 53/8615 |
| | | | 423/222 |
| 8,425,874 B2 | 4/2013 | Rameshni et al. | |
| 9,687,780 B2 | 6/2017 | Cross | |
| 2003/0103889 A1 * | 6/2003 | Mirsky | B01J 21/063 |
| | | | 423/326 |
| 2004/0013590 A1 | 1/2004 | Gangwal et al. | |
| 2004/0076570 A1 | 4/2004 | Jia | |
| 2006/0254769 A1 * | 11/2006 | Wang | C01B 31/262 |
| | | | 166/266 |
| 2006/0288919 A1 * | 12/2006 | Rameshni | C01B 17/0404 |
| | | | 110/345 |
| 2012/0321548 A1 * | 12/2012 | Rameshni | C01B 17/0404 |
| | | | 423/569 |
| 2015/0151245 A1 | 6/2015 | Cross | |

FOREIGN PATENT DOCUMENTS

| | | |
|---|---|---|
| EP | 0 270 223 | 8/1988 |
| GB | 4 384 51 | 11/1935 |
| GB | 1 444 127 | 9/1973 |
| GB | 1 421 961 | 7/1976 |

* cited by examiner

METHOD FOR REMOVING SULPHUR DIOXIDE FROM GAS STREAMS, USING TITANIUM DIOXIDE AS CATALYST

This application is the U.S. National Stage of International Application No. PCT/GB2014/050619, filed Mar. 3, 2014, which designates the U.S., published in English, and claims priority under 35 U.S.C. §§ 119 or 365(c) to Great Britain Application No. 1303737.9, filed Mar. 1, 2013 and Russian Application No. 2013121970, filed May 13, 2013.

FIELD OF THE INVENTION

The present invention relates to a method for removing sulphur dioxide from gaseous effluent, wherein a mixture of gaseous outlet gasses or gaseous effluent includes sulphur dioxide and carbon monoxide, and wherein, to perform a catalytic reduction, a catalyst is used to catalyse a reaction between carbon monoxide and sulphur dioxide to produce carbon dioxide and sulphur.

The invention also relates new uses of catalysts, in particular to new uses of titanium dioxide as a catalyst. Typically, said catalysts do not promote hydrogenation reactions or the reaction of carbon monoxide and water (the shift reaction). Typically, such catalysts do promote the reaction of hydrogen sulphide and sulphur dioxide (the "Claus" reaction) and/or the hydrolysis of carbon-sulphur compounds. The invention also provides methods and reactors comprising said catalysts.

BACKGROUND TO THE INVENTION

Sulphur dioxide is a typical by-product of industrial processes such as the smelting of sulphide ores or burning of sulphur containing fuels. If vented to the atmosphere without treatment, it can cause environmental problems such as acid rain.

The treatment of sulphur dioxide by thermal reduction to sulphur using methane, or a gas containing predominantly methane, such as natural gas, is known. However, in practice, such thermal reduction processes suffer from either soot formation or the need to add steam to the reaction mixture to avoid soot formation. In both scenarios, particularly the second, fuel consumption is high.

UK 1213760.0 discloses a process for producing sulphur from sulphur dioxide using thermal reduction with natural gas which has been successfully demonstrated on an industrial scale unit.

This process operates with high sulphur recovery efficiency and is efficient in the overall use of natural gas if a high temperature incinerator is needed downstream of the process. Such a high temperature incinerator can use the fuel values in the process gas as fuel.

Alternative processes have been proposed which use a hydrogenation catalyst following the thermal stage in order to react the reducing gases with sulphur dioxide.

The disadvantage of these processes are numerous and include:
i) the hydrogenation of sulphur which reduces the overall sulphur recovery efficiency,
ii) the high heat of reaction of the hydrogenation processes leads to high reactor outlet temperatures and a further loss of sulphur recovery efficiency,
iii) some hydrogenation catalysts have a tendency to form carbonyl sulphide, which also leads to a reduction in the sulphur recovery efficiency,
iv) the catalysts typically contain iron, nickel or cobalt in sulphide form, which can lead to high sulphur dioxide emission during plant shutdown operations, and environmental issues for spent catalyst disposal,
v) the catalysts are vulnerable to damage because the oxide form can be reduced to the metallic form during typical plant start-up and standby operations when natural gas and air are fired sub-stoichiometrically in the thermal reactor,
vi) substantially no hydrogen remains in the tail gases from the Claus stages with the consequence that hydrogen needed for tail gas clean-up processes, such as the SCOT process, must be provided separately, and
vii) substantially no fuel values remain in the tail gases for the Claus stages, so that all the fuel needed for an incinerator must be supplied separately.

U.S. Pat. No. 5,795,554, GB2087373 and U.S. Pat. No. 5,795,554 disclose catalysts for reacting carbon monoxide and sulphur dioxide to form carbon dioxide and sulphur; however, they do not show titanium dioxide to be a useful catalyst for the above reaction.

The present invention addresses these and other problems with prior art processes.

SUMMARY OF THE INVENTION

Accordingly, in a first aspect, the present invention provides the use of a catalyst comprising at least 90% by weight of titanium dioxide to catalyse a reaction between carbon monoxide and sulphur dioxide to produce carbon dioxide and sulphur to remove sulphur dioxide from gaseous effluent. Typically, the gaseous effluent of a smelter. Preferably, wherein the catalyst comprises at least 95% by weight of titanium dioxide, preferably at least 99.5% by weight titanium dioxide, preferably the catalyst consists essentially of titanium dioxide, preferably the catalyst consists of titanium dioxide. For the purpose of the invention, catalyst composition weight percentages are measured on a dry basis. Preferably, a majority, more preferably substantially all, of the carbon monoxide is consumed by the reaction.

In an embodiment, the catalysis occurs (is performed) at a temperature below 450° C., preferably from about 350° C. to about 420° C., more preferably not higher than about 390° C. It has been found that there is a sharp increase in the conversion of carbon monoxide at temperatures above 350° C., whereas at temperatures below 420° C., little or no reaction between hydrogen and sulphur dioxide occurs. Typically, the gaseous effluent further comprises hydrogen and preferably substantially none of the hydrogen is consumed (e.g. react with sulphur dioxide). Typically, the gaseous effluent comprises hydrogen sulphide and the catalyst simultaneously performs the Claus reaction.

In a further embodiment, catalysis is performed before a subsequent catalytic stage wherein said subsequent catalytic stage is a first catalytic stage from the Claus process.

In a second aspect the present invention provides the use of a catalyst, preferably titanium dioxide, to simultaneously catalyse a reaction between sulphur dioxide and carbon monoxide to produce carbon dioxide and sulphur and a reaction between hydrogen sulphide and sulphur dioxide to produce sulphur and water. Preferably, such that a majority, more preferably, at least about 75% by weight of the carbon monoxide is consumed by the reaction, more preferably at least about 90% by weight, even more preferably at least about 95% by weight, more preferably substantially all. Typically, while also promoting the Claus reaction and hydrolysis of carbon-sulphur compounds without significantly promoting hydrogenation or shift reactions.

In an embodiment, the catalyst comprises at least 90% by weight of titanium dioxide, more preferably at least 95% by weight of titanium dioxide, preferably at least 99.5% titanium dioxide, preferably the catalyst consists essentially of titanium dioxide, preferably the catalyst consists of titanium dioxide. Again, weight percentages are measured on a dry basis.

In an embodiment, the catalysis occurs at a temperature from about 350° C. to about 450° C., more preferably from about 350° C. but not higher than about 420° C., more preferably not higher than about 390° C.

In a further embodiment, catalysis is performed before a subsequent catalytic stage wherein said subsequent catalytic stage is a first catalytic stage from the Claus process.

In a third aspect, the present invention provides the use of titanium dioxide to catalyse a reaction between sulphur dioxide and carbon monoxide to produce carbon dioxide and sulphur at a temperature less than about 450° C., preferably from about 350° C. to about 420° C., more preferably not higher than about 390° C. Preferably, such that a majority, more preferably, at least about 75% by weight of the carbon monoxide is consumed by the reaction, more preferably at least about 90% by weight, even more preferably at least about 95% by weight, more preferably substantially all. Preferably, the titanium dioxide simultaneously catalyses a reaction between hydrogen sulphide and sulphur dioxide to produce sulphur and water. Typically, the catalyst promotes the Claus reaction and hydrolysis of carbon-sulphur compounds without significantly promoting hydrogenation or shift reactions.

Accordingly, in a fourth aspect the present invention provides a method for removing sulphur dioxide from gaseous effluent, preferably the gaseous effluent of a smelter furnace, by performing a catalytic reduction: wherein the gaseous effluent includes sulphur dioxide and carbon monoxide, and wherein the catalytic reduction is performed using a catalyst, preferably titanium dioxide, to catalyse a reaction between carbon monoxide and sulphur dioxide to produce carbon dioxide and sulphur. Preferably, such that a majority, more preferably, at least about 75% by weight of the carbon monoxide is consumed by the reaction, more preferably at least about 90% by weight, even more preferably at least about 95% by weight, more preferably substantially all. Preferably, the effluent also contains hydrogen sulphide and the titanium dioxide simultaneously catalyses a reaction between hydrogen sulphide and sulphur dioxide to produce sulphur and water. Typically, the catalyst promotes the Claus reaction and hydrolysis of carbon-sulphur compounds without significantly promoting hydrogenation or shift reactions.

In a first embodiment, the method comprises the steps of:
a. performing a thermal reduction step on the effluent to produce sulphur and a mixture of gaseous outlet gasses;
b. optionally, separating the mixture of gaseous outlet gasses from the sulphur; and
c. subsequently performing the catalytic reduction on the mixture of gaseous outlet gasses.

In a second embodiment, the method comprises the steps of:
a. performing a fuel supported Claus reaction on the effluent, typically to treat effluent comprising hydrogen sulphide, to produce sulphur and a mixture of gaseous outlet gasses;
b. optionally, separating the mixture of gaseous outlet gasses from the sulphur; and
c. subsequently performing the catalytic reduction on the mixture of gaseous outlet gasses.

Reacting sulphur dioxide with carbon monoxide has the significant advantage of reducing the requirement for complete reduction of sulphur dioxide during the thermal reduction step. This significantly reduces the consumption of natural gas (i.e. by up to 5%); thereby significantly reducing the cost of the process.

Furthermore, by performing a sulphur dioxide reduction step downstream of the fuel supported Claus reaction, the thermal reaction may be operated with a higher proportion of air or oxygen; thereby burning more hydrogen sulphide to form sulphur dioxide in the furnace. This increases the temperature; thereby reducing fuel use and the risk of soot formation.

Preferably following the catalytic reduction substantially no carbon monoxide remains.

Typically, the catalytic reduction step is performed in a reactor having a reactor inlet for receiving the mixture of gaseous outlet gases and a reactor outlet for expelling a gaseous mixture including the products of the catalytic reduction step.

In a further embodiment, the temperature of the mixture of the gaseous mixture at the outlet is greater than about 350° C., preferably greater than about 350° C. but below about 450° C., preferably between about 350° C. and about 420° C., preferably from about 350° C. to about 390°, more preferably at about 370° C.

Typically, the inlet temperature of the invention similar to those that are typical for the first catalytic stages of known Claus processes. The temperature at the outlet is higher than is typical for the first catalytic stages of known Claus processes. In embodiments, it is preferred that the temperature does not exceed about 390° C., or even 350° C., because above this temperature sulphur conversion by the Claus reaction drops and construction materials other than carbon steel must be used. The outlet temperature typically reflects the temperature of the catalyst. Typically, the catalysis is performed at a temperature less than about 450° C., preferably from about 350° C. to about 420° C.

Typically, the catalytic reaction is performed at pressures typical of an industrial Claus unit. Preferably, that is gauge pressure of from about 0.1 bar(g) to about 1 bar(g). Atmospheric pressure is understood to be 0 bar(g).

In a preferred embodiment, the catalyst comprises at least 90% by weight of titanium dioxide, preferably at least about 95% by weight, preferably at least 99.5% by weight of titanium dioxide (measured on a dry basis), preferably the catalyst consists essentially of titanium dioxide, preferably the catalyst consists of titanium dioxide.

In a preferred embodiment, the catalyst does not significantly catalyse hydrogenation of sulphur dioxide. Typically the catalyst does not significantly catalyse a reaction between hydrogen and sulphur and/or the reaction between carbon monoxide and water. Preferably, the catalyst does not significantly catalyse any of these reactions.

In embodiments, the catalyst is a hydrolysis catalyst for carbonyl sulphide and/or carbon bisulphide and/or is a Claus catalyst for the reaction of hydrogen sulphide and sulphur dioxide to form sulphur and water.

In an embodiment, the catalyst has a surface area of at least about 200 m$^2$/g, preferably at least about 240 m$^2$/g. Typically, the catalyst has a bulk density of from about 650 kg/m$^3$ to about 1000 kg/m$^3$, preferably from about 750 to about 800 kg/m$^3$. Preferably, the catalyst has a total pore volume (Hg) of from about 0.3 to about 0.65 cm$^3$/g, preferably from about 0.50-0.6 cm$^3$/g. Suitable catalyst is sold under the trade name S-7001 from Euro Support B.V.

In a preferred embodiment of the first embodiment, the thermal reduction process comprises the step of reacting sulphur dioxide and a fuel gas in a furnace, preferably wherein the heat required for performing the reaction is provided by combusting the fuel gas with oxygen. The oxygen may be pure or present in air. Suitable fuel gases may be selected from the group consisting of methane, ethane, propane, carbon monoxide or mixtures thereof, or gases high in methane, such as natural gas. Preferably, substantially only sulphur dioxide, fuel gas, and oxygen or air are supplied to the furnace. Preferably, substantially no hydrogen sulphide or sulphur is supplied to the furnace.

In a preferred embodiment, the fuel gas for reducing the sulphur dioxide is heated by combusting the fuel gas with oxygen. Typically, the fuel gas and sulphur dioxide are heated to a temperature of at least about 1000° C., preferably at least about 1100° C., more preferably at least about 1250° C., preferably from about 1200° C. to about 1400° C., preferably from about 1000° C. to about 1500° C.

In a preferred embodiment before step a) the effluent undergoes an absorption and regeneration process in order to provide sulphur dioxide for thermal reduction in step a); preferably, separating the sulphur dioxide from the remainder of the gaseous effluent provides concentrated sulphur dioxide and effluent suitable for discharge into the atmosphere.

Typically, concentrated sulphur dioxide is produced by using an absorption and regeneration process. Typical absorption and regeneration processes include, but are not limited to, carbon bed, solvent and chemical base processes, including amine gas treatment. Such processes and equipment for performing sulphur dioxide absorption and regeneration process are known in the art.

In a preferred embodiment of the second embodiment, the fuel supported Claus reaction comprises the step of partially reacting hydrogen sulphide with oxygen, preferably wherein heat is provided by combusting a fuel gas with the oxygen.

The combustion of fuel at the conditions in the Claus furnace produces carbon monoxide as well as carbon dioxide and water vapour. Hydrogen sulphide is partially oxidised as follows:

$2H_2S+3O_2 \rightarrow 2SO_2+2H_2O$

The oxidation reactions are strongly exothermic with the heat needed for the reactions provided partly by the combustion of hydrogen sulphide and partly by the combustion of fuel gas. The oxidation of hydrogen sulfide generates sulphur dioxide which itself reacts in subsequent reactions. The most important one is the Claus reaction: $2H_2S+SO_2 \rightarrow 3S+2H_2O$ The oxygen may be pure or present in air. Suitable fuel gases may be selected from the group consisting of, methane, ethane, propane, carbon monoxide or mixtures thereof, or gases high in methane, such as natural gas. Typically, hydrogen sulphide, oxygen and fuel gas are supplied to the furnace, although the other gasses including sulphur dioxide may also be present. The hydrogen sulphide may be from the effluent of a refinery or gas treating process.

As discussed, the hydrogen sulphide and oxygen are heated by combusting the fuel gas with oxygen and only partly by the combustion of hydrogen sulphide. Typically, the hydrogen sulphide and oxygen are heated to a temperature of at least about 1000° C., preferably at least about 1100° C., preferably from about 1000° C. to about 1300° C.

In a fifth aspect, the present invention provides the use of a catalyst which catalyses a reaction between carbon monoxide and sulphur dioxide to produce carbon dioxide and sulphur to remove sulphur dioxide from gaseous effluent, preferably the gaseous effluent of a smelter or the mixture of outlet gasses from a fuel supported Claus reaction, by reacting carbon monoxide with sulphur dioxide to produce carbon dioxide and sulphur.

In preferred embodiments of all aspects of the invention the catalytic reduction reactor also caries out the Claus reaction (between hydrogen sulphide and sulphur dioxide to make sulphur and water) and hydrolysis of carbon-sulphur compounds. In order to increase sulphur recovery further catalytic stages of the Claus process can be used.

In embodiments of all aspects of the invention, hydrogen sulphide is removed from the gaseous product mixture using the Claus process. The Claus process is well known in the art. Typically, one, two or more, Claus reactors are used following the catalytic reduction reactor of the invention. The more Claus reactors that are used, the better the recovery of sulphur from the process.

Typically, the ratio of reactants in the furnace (sulphur dioxide reduction or fuel supported Claus) is arranged to obtain about a 2:1 H2S:SO2 ratio in the process gases after hydrolysis of the carbon-sulphur species. (i.e in the tail gases following the final Claus reactor).

In a sixth aspect, the present invention provides a catalytic reactor for removing sulphur dioxide from an effluent gas mixture. Preferably, the catalytic reactor comprises a reactor chamber having an inlet for receiving the effluent gas mixture and an outlet for expelling a gaseous product mixture; and a catalyst bed located within said reactor chamber, said catalyst bed comprising a catalyst, typically titanium dioxide. Preferably, the effluent gas mixture comprises sulphur dioxide and carbon monoxide, and the catalyst catalyses a reaction between carbon monoxide and sulphur dioxide to produce carbon dioxide and sulphur. In use, the effluent gas mixture passes over and/or through the catalyst bed such that the sulphur dioxide and carbon monoxide can mix and react.

In a preferred embodiment, the effluent gas mixture is a mixture of gaseous outlet gasses produced by performing a thermal reduction step on sulphur dioxide from smelter effluent, preferably wherein the smelter effluent has undergone a process to provide concentrated sulphur dioxide, said thermal reduction step being performed on the concentrated sulphur dioxide. Alternatively, the effluent gas mixture is a mixture of gaseous outlet gasses produced by performing a fuel supported Claus reaction.

In a preferred embodiment, the catalytic reactor inlet is in fluid communication with a furnace performing a thermal reduction step, preferably wherein the thermal reduction step comprises combusting sulphur dioxide in the presence of a fuel gas and oxygen.

Preferably, the thermal reduction step comprises the step of reacting sulphur dioxide, a fuel gas and oxygen in a furnace. The oxygen may be pure or present in air. Suitable fuel gases may be selected from the group consisting of methane, ethane, propane, carbon monoxide or mixtures thereof, or gases high in methane, such as natural gas.

Typically, the fuel gas for reducing the sulphur dioxide is heated by combusting the fuel gas with oxygen. Typically, the fuel gas and concentrated sulphur dioxide are heated to a temperature of at least about 1000° C., preferably at least about 1100° C., more preferably at least about 1250° C., preferably from about 1200° C. to about 1400° C., preferably from about 1000° C. to about 1500° C.

In an alternative embodiment, the catalytic reactor inlet is in fluid communication with a furnace for performing a fuel supported Claus reaction, preferably wherein the fuel supported Claus reaction comprises the step of reacting hydrogen sulphide with oxygen, preferably wherein heat is provided by combusting a fuel gas with the oxygen.

The oxygen may be pure or present in air. Suitable fuel gases may be selected from the group consisting of methane, ethane, propane, carbon monoxide or mixtures thereof, or gases high in methane, such as natural gas. Typically, hydrogen sulphide, oxygen and fuel gas are supplied to the furnace, although the other gasses including sulphur dioxide may also be present. The hydrogen sulphide may be from the effluent of a refinery or gas treatment.

As discussed, the hydrogen sulphide and oxygen are heated by combusting the fuel gas with oxygen. Typically, the hydrogen sulphide and oxygen are heated to a temperature of at least about 1000° C., preferably at least about 1100° C., preferably from about 1000° C. to about 1300° C.

In a preferred embodiment, the outlet of the catalytic reactor is in fluid communication with a reactor performing the first catalytic stage of a Claus process.

Preferably, the temperature of the effluent gas mixture at the catalytic reactor inlet is less than about 250° C. and/or the temperature of the gases at the outlet is greater than about 300° C. but below about 390° C. Preferably, the temperature within the reactor does not exceed about 390° C., more preferably below about 350° C.

Preferably, the temperature within the reactor is greater than about 350° C., preferably greater than about 350° C. but below 450° C.; preferably the temperature is from about 350° C. to about 420° C., preferably from about 350° C. to about 390° C., more preferably the temperature is about 370° C.

Typically, the pressure in the reactor is 0.1 bar(g) to 1.0 bar(g).

In preferred embodiments, the catalyst comprises a material selected from the group consisting of titanium dioxide, preferably the catalyst consists of titanium dioxide.

In a seventh aspect the present invention provides, a smelter comprising a catalytic reactor according to the sixth aspect of the invention.

In an embodiment the smelter further comprises means for removing sulphur dioxide from gaseous effluent from the smelter so as to provide concentrated sulphur dioxide and effluent suitable for discharge into the atmosphere. Typically, the concentrated sulphur dioxide is produced by using an absorption and regeneration process. Typical absorption and regeneration processes include, but are not limited to, carbon bed, solvent and chemical base processes, including amine gas treatment. Such processes and equipment for performing sulphur dioxide absorption and regeneration process are known in the art.

In a preferred embodiment, the smelter further comprises a furnace for performing a thermal reduction step on the concentrated sulphur dioxide, preferably wherein the thermal reduction step comprises combusting sulphur dioxide and oxygen in the presence of a fuel gas. Typically, the furnace is in fluid communication with the inlet of the catalytic reactor according to fourth aspect of the invention. Typically, the outlet of catalytic reactor is in fluid communication with a subsequent catalytic reactor for performing the first catalytic stage of the Claus process. Condensers for the removal of sulphur may be used between the furnace and the catalytic reactor and/or between the catalytic reactor and the subsequent catalytic reactor for performing the first catalytic stage of the Claus process.

In a preferred embodiment, the smelter comprises a furnace for performing a fuel supported Claus reaction, preferably wherein the fuel supported Claus reaction comprises the step of reacting hydrogen sulphide with oxygen, preferably wherein part of the heat is provided by combusting a fuel gas with the oxygen. Typically, the furnace is in fluid communication with the inlet of the catalytic reactor according to sixth aspect of the invention. Typically, the outlet of catalytic reactor is in fluid communication with a subsequent catalytic reactor for performing the first catalytic stage of the Claus process. Condensers for the removal of sulphur may be used between the furnace and the catalytic reactor and/or between the catalytic reactor and the subsequent catalytic reactor for performing the first catalytic stage of the Claus process.

In all aspects, preferably, the catalyst is substantially free from, preferably free from lanthanum, yttrium, gadolinium, lutetium, zirconium, aluminium, silicas, cobalt, molybdenum, tungsten, vanadium, chromium, nickel, iron and mixtures thereof, including their oxides. Preferably, the catalyst is substantially free from, preferably free from, transition metals other than titanium.

In all aspects of the invention, preferably the catalyst temperature is such that a reaction between hydrogen and sulphur dioxide is avoided, whilst allowing the reaction of carbon monoxide with sulphur dioxide.

All aspects of the invention may be combined mutatis mutandis with the other aspects of the invention. In particular, the smelter aspect may include the catalytic reactor of the catalytic reactor aspect and/or employ the method and use aspects.

BRIEF DESCRIPTION OF THE FIGURES

The above-mentioned and other features and objects of this invention, and the manner of obtaining them, will become more apparent and the invention itself will be better understood by reference to the following description of embodiments of the invention taken in conjunction with the accompanying drawings, wherein.

Although the drawings represent exemplary embodiments of the present invention, the drawings are not necessarily to scale and certain features may be exaggerated to better illustrate and explain the invention. The exemplification set out herein illustrates exemplary embodiments of the invention only.

DETAILED DESCRIPTION

The present invention provides a method for removing sulphur dioxide from gaseous effluent or a mixture of gaseous outlet gasses, preferably the gaseous effluent of a smelter furnace, by performing a catalytic reduction reaction, wherein the mixture of gaseous outlet gasses or effluent includes sulphur dioxide and carbon monoxide, and wherein the catalytic reduction is performed using a catalyst which catalyses a reaction between carbon monoxide and sulphur dioxide to produce carbon dioxide and sulphur.

Typically, the method comprises the steps of:
a. performing a thermal reduction step on the effluent to produce sulphur and a mixture of gaseous outlet gasses;
b. separating the mixture of gaseous outlet gasses from the sulphur; and c. subsequently performing a catalytic reduction on the mixture of gaseous outlet gasses.

Alternatively, the method comprises the steps of:

a. performing a fuel supported Claus reaction to produce sulphur and a mixture of gaseous outlet gasses;
b. optionally, separating the mixture of gaseous outlet gasses from the sulphur; and
c. subsequently performing the catalytic reduction on the mixture of gaseous outlet gasses.

Figure 1:
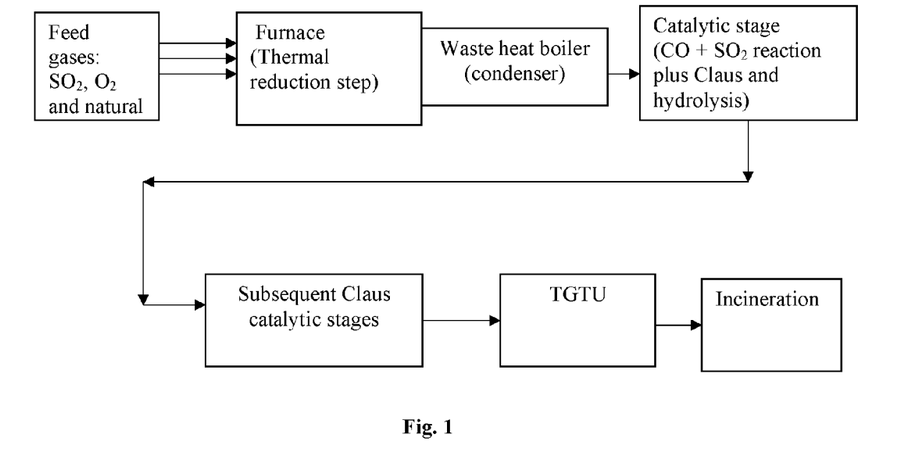
FIG. 1 is a schematic of an exemplary process according to the invention.

FIG. 1 shows a schematic representation of an exemplary process according to the invention.

Thermal reduction of sulphur dioxide is performed in the furnace. The feed gasses for the furnace comprise a fuel gas, sulphur dioxide and air. Typically, substantially no other gasses are present in the feed gases.

Typically, the sulphur dioxide is collected from the effluent of a smelter furnace. Preferably, the effluent undergoes an absorption and regeneration process in order to provide sulphur dioxide for thermal reduction. Preferably, separating the sulphur dioxide from the remainder of the smelter effluent provides concentrated sulphur dioxide and effluent suitable for discharge into the atmosphere.

Typical absorption and regeneration processes include, but are not limited to, carbon bed, solvent and chemical base processes, including amine gas treatment. Such processes and equipment for performing sulphur dioxide absorption and regeneration process are known in the art.

The air is collected from the surrounding environment. For the avoidance of doubt, it contains oxygen. Alternatively, pure oxygen or oxygen enriched air can be used.

The fuel gas is preferably natural gas, although it may also be selected from the group consisting of methane, ethane, propane, carbon monoxide or mixtures thereof.

The fuel gas for reducing the sulphur dioxide is heated by combusting the fuel gas with oxygen. Typically, the fuel gas and sulphur dioxide are heated to a temperature of at least about 1000° C., preferably at least about 1100° C., more preferably at least about 1250° C., preferably from about 1200° C. to about 1400° C., preferably from about 1000° C. to about 1500° C.

The products from the thermal reduction step flow from the furnace to waste heat boiler or condenser where they are cooled such that the sulphur formed in the reduction step condenses. The condensed sulphur is preferably removed.

Figure 3:
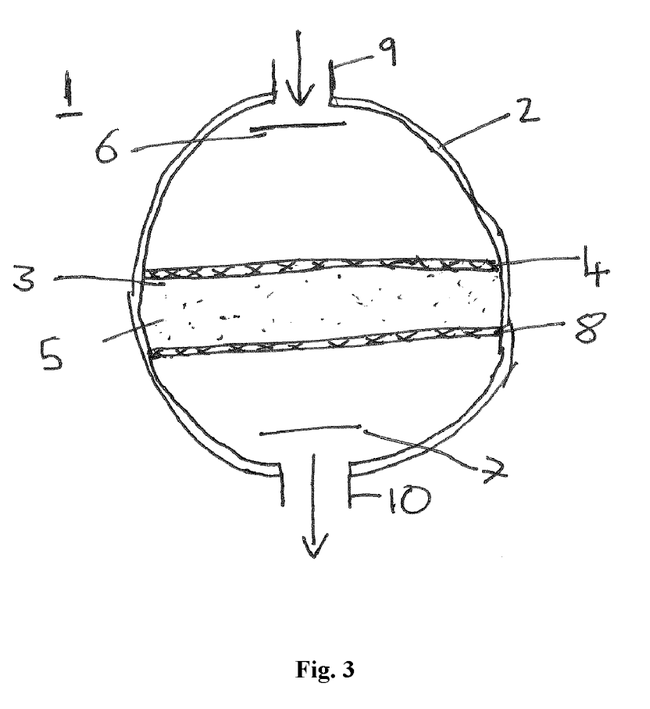
FIG. 3 shows a catalytic reactor according the sixth aspect of the invention.

The products of the thermal reduction step are then transferred to a catalytic reactor to undergo the method according to the invention. FIG. 3 illustrates a catalytic reactor (1) according to the invention.

The catalytic reactor removes sulphur dioxide from effluent gas mixture. In the exemplified case, the effluent gas mixture is the mixture of gaseous products from the thermal reduction step with the sulphur removed, although, in alternative arrangements, the sulphur may be present.

The effluent gas mixture entering the reaction chamber comprises sulphur dioxide and carbon monoxide, and the catalyst catalyses a reaction between carbon monoxide and sulphur dioxide to produce carbon dioxide and sulphur, preferably as well as promoting the Claus reaction and hydrolysis of carbon-sulphur compounds contained in the effluent gases from the furnace.

Following the reaction in the reactor, the sulphur can be removed using a separate condenser. Preferably, the sulphur remains gaseous while present in the reactor, so as to prevent fouling of the catalyst.

The remaining hydrogen sulphide and sulphur dioxide in the outlet gasses are treated using the catalytic stages of a typical Claus process. The Claus process is well known to those skilled in the art, as are the catalytic steps conducted therein. The general formula for such catalysis is $2H_2S + SO_2 \rightarrow 3S + 2H_2O$. In the case of the invention, the Claus process catalytic steps are used to increase sulphur recovery.

In the Claus process, the catalytic recovery of sulphur consists of three sub-steps: heating, catalytic reaction and cooling plus condensation. These three steps are normally repeated a maximum of three times. The more Claus reactors that are used, the better the recovery of sulphur from the process. In the embodiment shown in FIG. 1, incineration and a tail-gas treatment unit (TGTU) are used downstream of the Claus catalytic stages.

Returning to FIG. 3, the catalytic reactor (1) comprises a reactor chamber (2) and a catalyst bed (3). The reactor chamber (2) is lined with refractory cement. The catalyst bed (3) comprises a layer of catalyst (5) supported by inert refractory balls in turn supported by a stainless steel mesh (4, 8) resting on a support structure (not shown). Typically, the layer of catalyst (5) will be between about 500 mm and about 2000 mm deep, preferably between about 750 mm and 1500 mm deep, preferably between about 1000 mm and about 1200 mm deep. Baffles (6, 7) are used to improve the distribution of gases within the reaction chamber.

The catalyst typically consists of titanium dioxide. The catalyst may be in the form of balls, pellets or extrudate.

Typically, the catalyst has a surface area of at least about 200 $m^2/g$, preferably at least about 240 $m^2/g$. Typically, the catalyst has a bulk density of from about 650 $kg/m^3$ to about 1000 $kg/m^3$, preferably from about 750 to about 800 $kg/m^3$. Preferably, the catalyst has a total pore volume (Hg) of from about 0.3 to about 0.65 $cm^3/g$, preferably from about 0.50-0.6 $cm^3/g$. Suitable catalyst is sold under the trade name S-7001 from Euro Support B.V.

The reactor chamber (1) comprises an inlet (9) for receiving the effluent gas mixture and an outlet (10) for expelling a gaseous mixture including the products of the catalytic reduction step. The outlet (10) will typically be in fluid communication with a subsequent catalytic reactor chamber which performs the first subsequent catalytic step of the Claus process. Alternatively, and preferentially, a condenser may be positioned between the reactor chamber (1) of the invention and the subsequent Claus catalytic reactor which in use removes sulphur from the gaseous mixture including the products of the catalytic reduction step and Claus reaction occurring in the reactor of the invention. The inlet (9) will typically be in fluid communication with either the furnace for performing a sulphur dioxide thermal reduction or the furnace for a fuel supported Claus reaction or a condenser for removing sulphur from the gaseous products of the thermal reduction or fuel supported Claus reaction.

Figure 2:
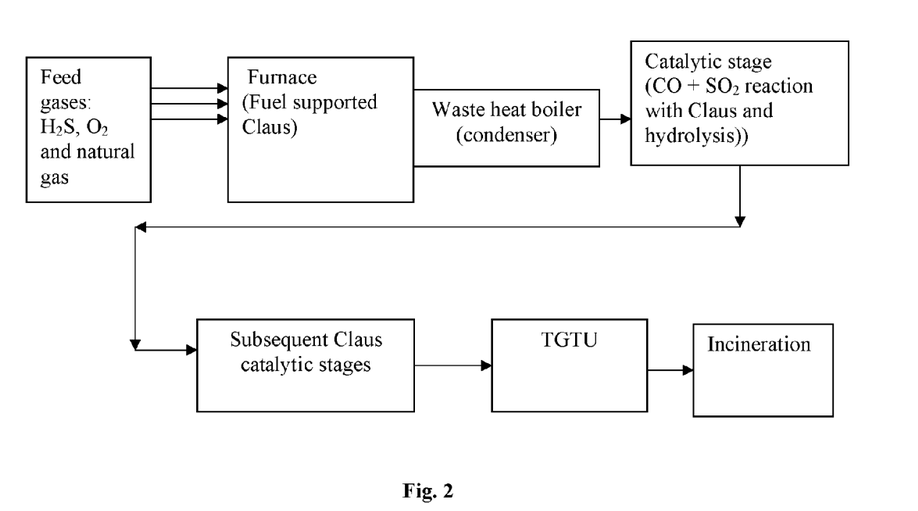
FIG. 2 is a schematic of an alternative exemplary process according to the invention.

FIG. 2 show an alternative exemplary embodiment according to the second embodiment of the first aspect of the invention, including performing a fuel supported Claus reaction to produce sulphur and a mixture of gaseous outlet gasses. The catalytic reactor (1) shown in FIG. 3 may be used in the process of FIG. 2.

Examples

Pilot trials of a thermal process using natural gas to reduce sulphur dioxide to sulphur in an industrial scale Claus plant were carried out.

A first catalytic reactor following the thermal stage contained titanium dioxide catalyst. The catalyst did not strongly catalyse hydrogenation or shift reactions which were demonstrated by the co-existence of sulphur dioxide and hydrogen in the reactor outlet gasses.

However significant amounts of carbon monoxide did react and this was explained by the direct reaction of carbon monoxide and sulphur dioxide.

This unexpected reaction on a hydrolysis catalyst has significant advantages over the use of a hydrogenation catalyst.

The analysis of gases to and from the CO removal reactor was as follows in Table 1.

TABLE 1

|  | REACTOR INLET Mol % | REACTOR OUTLET Mol % |
|---|---|---|
| H2 | 1.747 | 1.771 |
| O2 | 0.000 | 0.000 |
| N2 | 27.660 | 31.173 |
| CO | 4.640 | 0.757 |
| CO2 | 40.363 | 53.892 |
| H2S | 14.617 | 11.173 |
| COS | 4.040 | 0.469 |
| SO2 | 6.903 | 0.762 |
| CS2 | 0.030 | 0.003 |
| TOTAL | 100.000 | 100.000 |

The analysis was on a dry basis and does not show elemental sulphur.

The removal of $SO_2$ and creation of $CO_2$ is consistent with the overall reactions: $SO_2$ removal: (Overall reactions shown)

$$SO_2+2H_2S=3S+2H_2O$$

$$SO_2+2CO=2CO_2+S$$

$$SO_2+2COS=2CO_2+3S$$

$$SO_2+CS_2=CO_2+3S$$

$$SO_2+2H_2=S+2H_2O$$

$CO_2$ creation: (overall reactions shown)

$$SO_2+2CO=2CO_2+S$$

$$SO_2+2COS=2CO_2+3S$$

$$SO_2+CS_2=CO_2+3S$$

Note—S is shown for convenience—the sulphur formed is $S_6$ or $S_8$.

From the measured results the above overall reactions are consistent with the sulphur dioxide used and carbon dioxide formed and negligible amounts of sulphur were reconverted to hydrogen sulphide.

Laboratory trails were carried out to test the action of the titanium dioxide catalyst with a mixture of gases predicted from the thermal stage of a Claus type sulphur recovery process or a sulphur dioxide reduction process.

The gas mixture fed to the catalytic reactor contained hydrogen sulphide, sulphur dioxide, carbon dioxide, nitrogen, carbon monoxide, hydrogen, carbonyl sulphide, carbon bisulphide, sulphur vapour and water vapour.

The gas composition was such that there was an excess of $H_2S$ over $SO_2$ in the effluent gases from the catalyst, which is typical for industrial Claus plant operations.

There was a sharp rise in carbon monoxide conversion to practically 100% at around 350° C., and the hydrogen conversion increased slowly only after 420° C. was reached.

Most of the carbonyl sulphide and carbon bisulphide were destroyed. (i.e. a normal reaction for the first catalytic stage of a Claus plant).

The results show that for this catalyst carbon monoxide reacts with sulphur dioxide at a lower temperature than hydrogen reacts with sulphur dioxide. This means that the catalyst temperature can be adjusted to avoid reaction of hydrogen while allowing the reaction of carbon monoxide.

It will be appreciated by those skilled in the art that the foregoing is a description of a preferred embodiment of the present invention and that variations in design and construction may be made to the preferred embodiment without departing from the scope of the invention as defined by the appended claims.

The invention claimed is:

1. A method comprising removing sulphur dioxide from gaseous effluent using a Claus catalyst,
   wherein the gaseous effluent includes sulphur dioxide, hydrogen and carbon monoxide,
   wherein the Claus catalyst comprises at least 90% by weight of titanium dioxide to catalyse a catalytic reaction between carbon monoxide and sulphur dioxide to produce carbon dioxide and sulphur to remove sulphur dioxide from the gaseous effluent,
   wherein the catalytic reaction is performed at a gauge pressure of from 0.1 bar(g) to 1 bar(g), and wherein the catalytic reaction occurs at a temperature from about 350° C. to about 450° C.

2. The method according to claim 1 wherein the Claus catalyst simultaneously catalyses a reaction between sulphur dioxide and carbon monoxide to produce carbon dioxide and sulphur and a reaction between hydrogen sulphide and sulphur dioxide to produce sulphur and water.

3. The method according to claim 1 wherein the Claus catalyst comprises at least 95% by weight of titanium dioxide.

4. The method according to claim 1 wherein the Claus catalyst consists essentially of titanium dioxide.

5. The method according to claim 1 wherein the gaseous effluent comprises hydrogen sulphide.

6. The method according to claim 1, wherein the catalytic reaction is performed at a temperature from about 350° C. to a temperature below 420° C.

7. The method according to claim 1, wherein the catalytic reaction is performed at a temperature from about 350° C. to a temperature below 390° C.

8. A method for removing sulphur dioxide from gaseous effluent by performing a catalytic reduction using a Claus catalyst:
   wherein the gaseous effluent includes sulphur dioxide, hydrogen and carbon monoxide,
   wherein the catalytic reduction is performed at a gauge pressure of from 0.1 bar(g) to 1 bar(g),
   wherein the catalytic reduction is performed using titanium dioxide to catalyse a reaction between carbon monoxide and sulphur dioxide to produce carbon dioxide and sulphur such that a majority of the carbon monoxide reacts, and
   wherein the catalytic reduction is performed at a temperature from about 350° C. to about 450° C.

9. The method according to claim 8 further comprising the steps of:
   a. performing a thermal reduction step on the gaseous effluent to produce sulphur and a mixture of gaseous outlet gasses;
   b. optionally, separating the mixture of gaseous outlet gasses from the sulphur; and c. subsequently performing the catalytic reduction on the mixture of gaseous outlet gasses.

10. The method according to claim 9 wherein the catalytic reduction is performed in a reactor having a reactor inlet for receiving the mixture of gaseous outlet gases and a reactor outlet wherein the temperature of the mixture of gaseous outlet gases at the inlet is less than about 250° C.

11. The method according to claim 9, wherein the thermal reduction step comprises the step of reacting sulphur dioxide and a fuel gas in a furnace.

12. The method according to claim 11 wherein the fuel gas comprises methane.

13. The method according to claim 11, wherein the sulphur dioxide and fuel gas are heated sufficiently so that they react by combusting the fuel gas and oxygen in the furnace.

14. The method according to claim 8 further comprising the steps of:
a. performing a fuel supported Claus reaction on the gaseous effluent to produce sulphur and a mixture of gaseous outlet gasses;
b. optionally, separating the mixture of gaseous outlet gasses from the sulphur; and
c. subsequently performing the catalytic reduction on the mixture of gaseous outlet gasses.

15. The method according to claim 14, wherein the fuel supported Claus reaction comprises the step of reacting hydrogen sulphide and oxygen in a furnace.

16. The method according to claim 15 wherein the fuel gas comprises methane.

17. The method according to claim 15, wherein the hydrogen sulphide and oxygen are heated by combusting a fuel gas and oxygen in the furnace.

18. The method according to claim 8 wherein the catalyst has one or more of a surface area of at least about 120 m2/g, a bulk density of from about 650 to about 920 kg/m3, and a total pore volume (Hg) of from about 0.45 to about 0.60 cm3/g.

19. The method according to claim 8 wherein the catalyst also catalyses the reaction between hydrogen sulphide and sulphur dioxide to make sulphur and/or also the hydrolysis of carbon-sulphur compounds, including carbonyl sulphide and/or carbon bisulphide.

20. The method according to claim 8, wherein the catalytic reduction is performed at a temperature from about 350° C. to a temperature below 420° C.

21. The method according to claim 8, wherein the catalytic reduction is performed at a temperature from about 350° C. to a temperature below 390° C.

* * * * *